R. B. TEWKSBURY.
THREAD CUTTING TOOL.
APPLICATION FILED JAN. 27, 1911.

1,006,512.

Patented Oct. 24, 1911.

3 SHEETS—SHEET 1.

R. B. TEWKSBURY.
THREAD CUTTING TOOL.
APPLICATION FILED JAN. 27, 1911.

1,006,512.

Patented Oct. 24, 1911.

3 SHEETS—SHEET 2.

R. B. TEWKSBURY.
THREAD CUTTING TOOL.
APPLICATION FILED JAN. 27, 1911.

1,006,512.

Patented Oct. 24, 1911.
3 SHEETS—SHEET 3.

Witnesses.
E. B. Gilchrist
H. P. Sullivan

Inventor.
Russell B. Tewksbury
by Thurston & Kwis
Attorneys

UNITED STATES PATENT OFFICE.

RUSSELL B. TEWKSBURY, OF CLEVELAND, OHIO.

THREAD-CUTTING TOOL.

1,006,512.  Specification of Letters Patent.  Patented Oct. 24, 1911.

Application filed January 27, 1911. Serial No. 604,930.

*To all whom it may concern:*

Be it known that I, RUSSELL B. TEWKSBURY, a citizen of the United States, residing at Cleveland, in the county of Cuyahoga and State of Ohio, have invented a certain new and useful Improvement in Thread-Cutting Tools, of which the following is a full, clear, and exact description.

This invention relates to tools adapted for cutting tapered threads on cylindrical bars, whether tubular or solid.

A great variety of forms of such thread cutting tools are known and are in use. They are of two varieties, to wit: those in which the thread cutting chasers gradually recede during the thread cutting operation; and those in which the thread cutting chasers do not so recede, but are themselves tapered on their cutting ends to correspond with the required taper on the "work." In both of these varieties of thread cutting tools, the chasers are required not only to cut the threads, but to cut away all surplus stock to produce the taper on the work. This imposes upon said chasers so much work that they do not last long, and require to be taken out and sharpened or re-cut from time to time.

The object of the present invention is to relieve the chasers of much of the burden which they have heretofore had to carry; and the invention consists in providing a thread cutting tool having thread cutting chasers, with receding cutters arranged to act upon the work before it reaches the chasers and to turn the work into the tapered form so that, when the work reaches the chasers, all they have to do is to cut the thread upon the tapered end of the work.

The term "cutter" as used herein indicates a tool such as is commonly employed in lathes for turning down the "work."

The invention is shown embodied in a portable hand tool which in the trade is known by the name of die stock. The invention, however, is not alone useful with such portable hand tools, but may be embodied in a so-called die head adapted to be used in a machine of the lathe type, in power operating die stocks, pipe threading machines, and the like.

Figure 1:
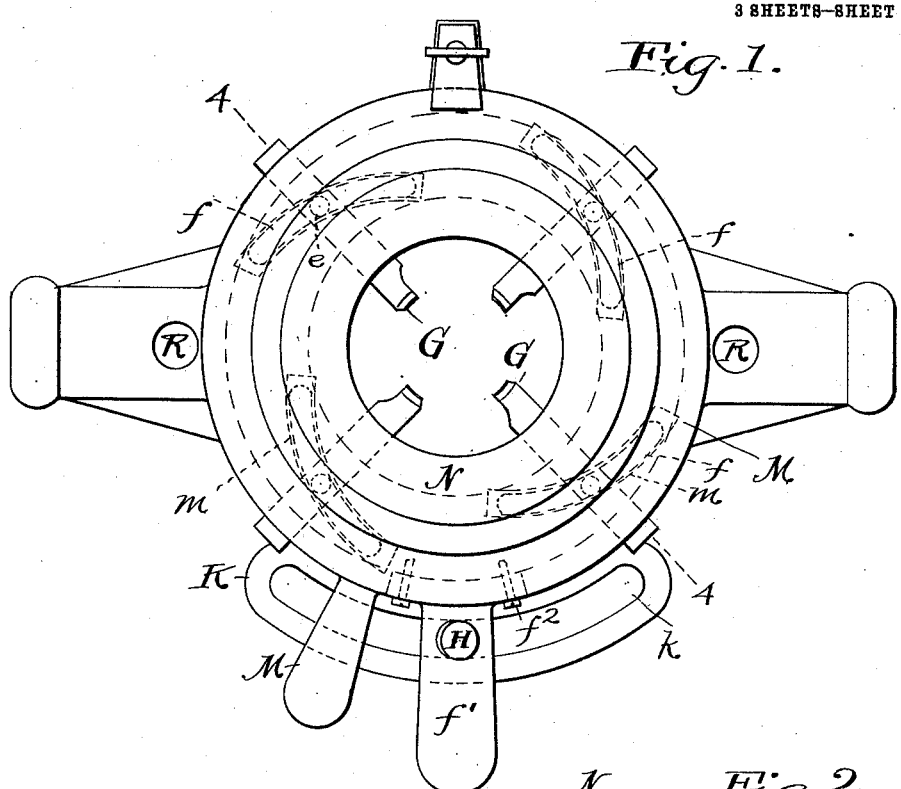
Figure 2:
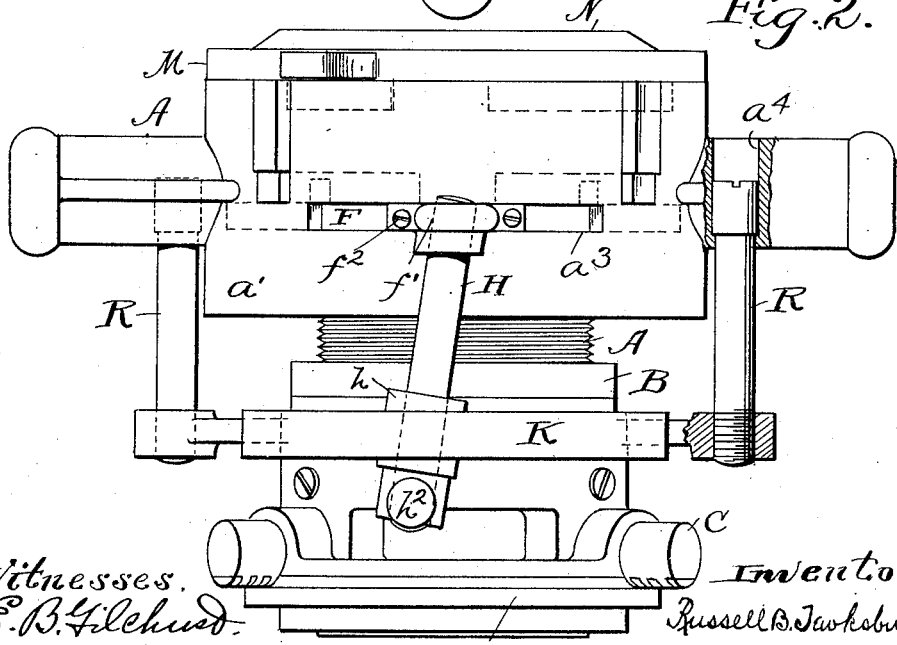
Figure 3:
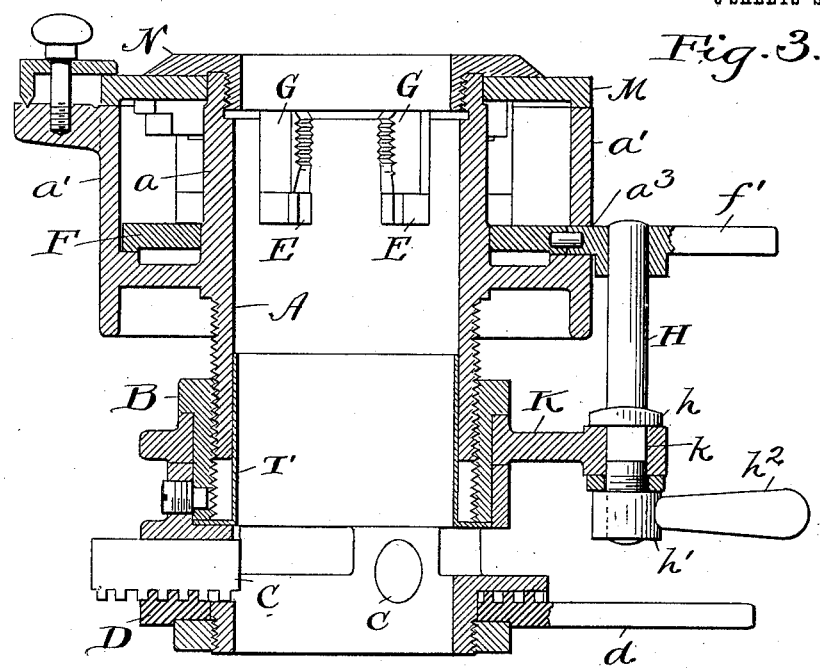
Figure 4:
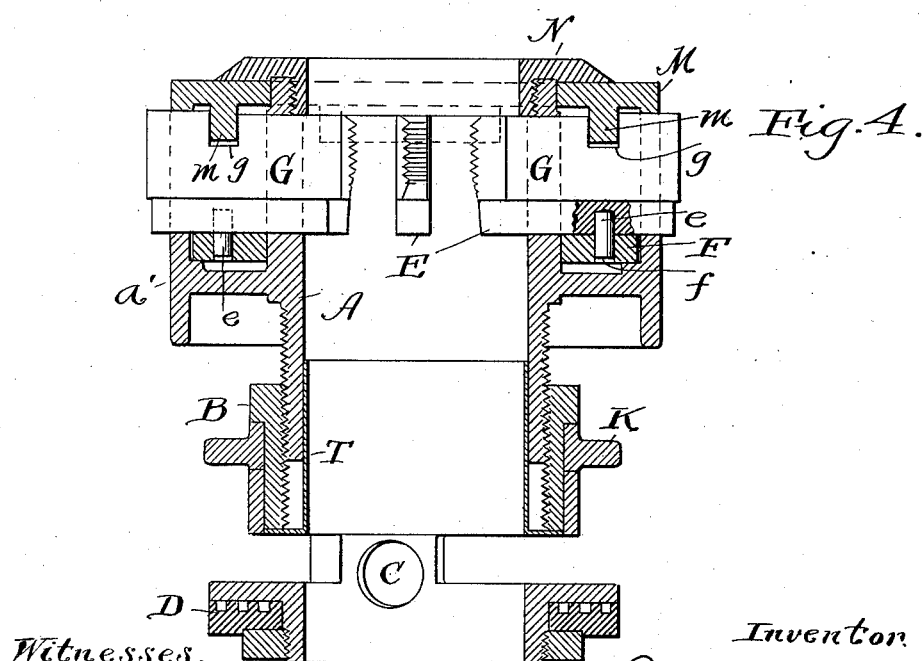
Figure 5:
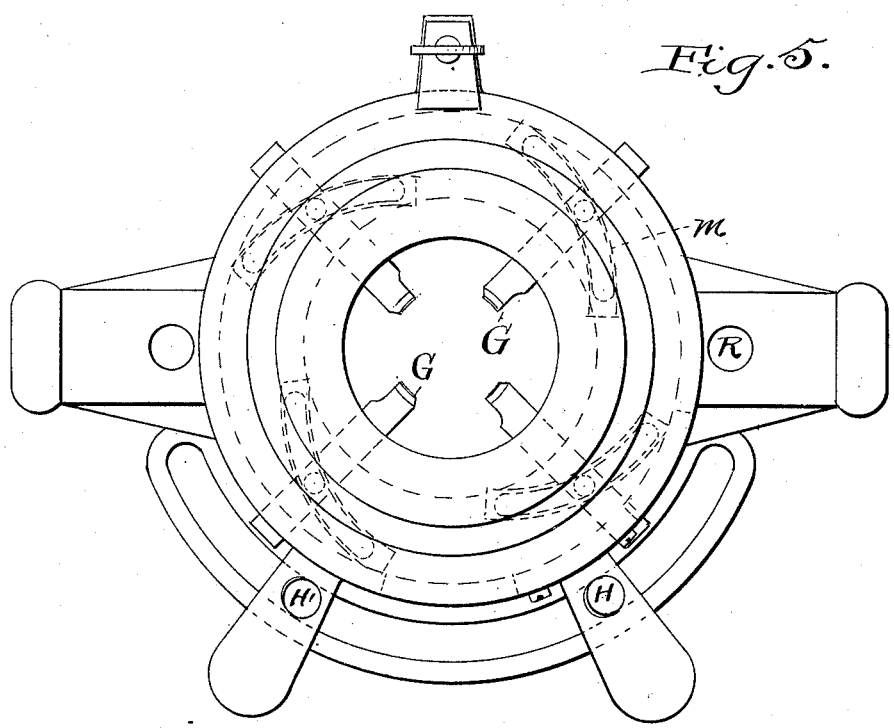
Figure 6:
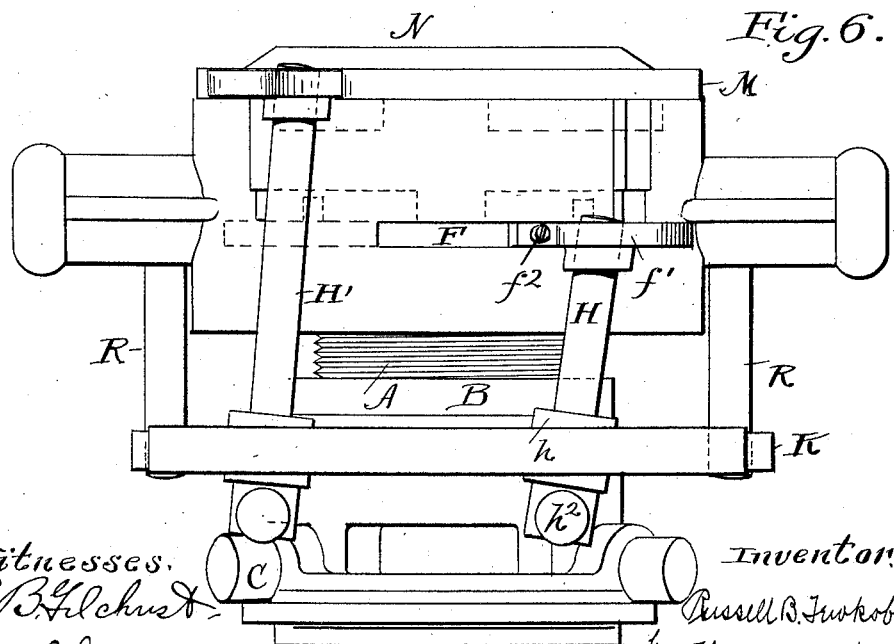

In the drawing, Figure 1 is an end view of a die stock in which the invention is embodied. Fig. 2 is a side elevation of the same, with a portion of the ring K and one of the handle sockets in section. Fig. 3 is a side elevation from another direction, and this view is partly shown in a central longitudinal section. Fig. 4 is a central longitudinal sectional view in the plane indicated by line 4—4 on Fig. 1. Fig. 5 is an end view of a modified form of the invention; and Fig. 6 is a side elevation of this modified form.

The invention and the specific embodiments thereof shown in the drawing will be understood from the following description.

Referring to the parts by letters, A represents the tubular stock, and B represents the tubular work holder. The former screws into the latter, and thereby when the stock is turned, it will, of necessity, remain concentric with the work holder, and will at the same time move longitudinally relative to the work holder at a rate determined by the pitch of the engaging screw threads which must be of the same pitch as the thread which the tool is desired to cut on a piece of cylindrical stock. The work holder is intended to be rigidly clamped upon the work. To enable this to be done three, more or less, radially movable clamping pins are mounted in the work holder, and are in engagement with a cam plate D also mounted on the work holder and provided with a handle $d$ by which it may be turned. This is familiar construction and requires no further amplification.

The stock is provided at its front end with an axial barrel $a$, and, at a suitable distance out therefrom, a concentric cylindrical flange $a'$. A suitable number of radial guide-ways $a^2$ are cut through the barrel $a$ and the flange $a'$, and in these guide-ways are mounted cutters E. The inner or cutting edges of these cutters are shaped like the cutters used in lathes for turning down work, and they are provided in this device for the purpose of turning off surplus stock on the end of the work, so as to give it the required taper before the threads are cut thereon by the chasers.

A cam plate F is rotatably mounted upon the barrel $a$ and within the flange $a'$. This cam plate contains cam grooves $f$ into which the downwardly extended pins $e$ fixed to the cutters E project. A circumferential slot $a^3$ is cut in the flange $a'$ in order that a handle $f'$ may pass through it, and be connected rigidly with the cam plate F by screws $f^2$, or by other suitable means. The passage of this handle through the slot helps to keep the cam plate down in working position. It is obvious that by the turning of this cam plate the cutters E may be caused to move radially inward or outward, for the purpose of adjustment, or to cause their simultaneous gradual recession as the work progresses. The particular means shown in the drawing for causing this gradual recession as the work progresses consists of an inclined templet post H which is adjustably clamped in a concentric slot $k$ in a ring K which is compelled to rotate on the work holder in unison with the stock by means of two pins R, R, fixed to said ring and extended therefrom in a direction parallel with the axis of the tool into longitudinal holes $a^4$ in the stock, but said ring is in a circumferential groove in the work holder and is thereby held against longitudinal movement thereon. The templet post H has, above the part of the ring in which said post is formed, a flange $h$. The lower end of the post is threaded; and a nut $h'$, provided with a convenient operating handle $h^2$, is fitted to this threaded end so that when the post is adjusted to proper position in the slot, it may be quickly clamped to said ring. The upwardly projecting end of this templet post H passes through a hole in a projecting part, preferably the handle $f'$ of the cam plate F. It is obvious, therefore, that when the work holder is clamped on the work and the stock is turned, it will move longitudinally relative to the work holder, the handle $f'$ will slide down on the templet post H, and thereby the cam plate F will be slowly turned in the direction which will cause a gradual recession of the cutters E. The stock also carries radially movable chasers G which are mounted in radial guide-ways thereon. In the construction shown in the drawing, these chasers are mounted to move in the same radial guide-ways in which the cutters E move. They are nearer the end of the stock but are in contact with the cutters E. A cam plate M of familiar construction is rotatably mounted upon the barrel $a$ and has cam ribs $m$ which enter slots $g$ in these chasers. A cap plate N which screws into the end of the barrel $a$ overhangs the cam plate M and keeps it in working position. By turning this cam plate, the chasers may be adjusted to the required position, and then fixed there by suitable means, as clamps.

In the operation of the device, shown in Figs. 1–4, inclusive, it is intended to clamp this cam plate immovably in this position, which position should be such that when, by the revolution and longitudinal advance of the stock relative to the stationary work the cutters E shall have turned said work to the required taper, the chasers will engage this tapered end and will cut a thread thereon. As these chasers cut the thread, they are only required to do a minimum of work, namely, so much work as consists in cutting or chasing the spiral grooves.

It is essential to any embodiment of this invention that the cutters E shall have the capacity of receding, as they are doing their work, at a rate determined by the desired taper; and any suitable means may be employed to compel or permit the recession. It is not, however, necessary that the chasers shall have this capacity of recession while they are doing their work. Accordingly the drawing shows in Figs. 1 to 4, inclusive, a construction in which the chasers do not so recede, although they are adjustable to size. In Figs. 5 and 6 a modification is shown in which these chasers are also caused to recede gradually while they are cutting threads. In this construction a second templet post H' is adjustably fixed in the same or a different concentric slot $k$ in ring K, and this second inclined templet post goes through a hole in a laterally projecting part of the cam plate M.

It is to be understood that the particular mechanism shown for receding said cutters is merely typical, and is not an essential part of the invention. Any other mechanism, and there are a dozen, more or less, mechanisms well known in this art adapted for the purpose, may be employed in place of this shown to cause or permit the recession of said cutters E, or the chasers G, if it is thought desirable to impart to them the capacity to recede. Each of the two cam plates F and M, act as adjusters, one for adjusting simultaneously all of the cutters, and one for adjusting simultaneously all of the chasers, to the particular diameter of the work. There are, however, several forms of adjusters known in this art, and capable of employment in a tool embodying the invention. It will therefore be understood that the term adjuster as used in the claims is intended to include not only the cam plate form of adjuster as shown in the drawings, but other well known and equivalent forms.

The drawing in Figs. 3 and 4 show a cylindrical chip shield T fixed to the work holder and projecting into and closely fitting the tubular extension of the stock. This chip shield is, however, no part of this invention, and may be used or omitted at will.

Having described my invention, I claim:

1. In a tool for cutting tapered threads, the combination with a stock adapted to turn and to move longitudinally relative to the work, cutters movably mounted on said stock, mechanism whereby said cutters are adapted to gradually recede as they operate on the work, and chasers adjustably mounted on said stock in position to engage the "work" after it has passed and has been tapered by said cutters.

2. In a tool for cutting tapered threads, the combination of a tubular work holder adapted to embrace and be fixed to the work to be threaded, a stock having a lead screw connection with said work holder, a set of cutters movably mounted on the stock, an adjuster carried by the stock for simultaneously adjusting all of said cutters to the diameter of the work, means for slowly moving said adjuster, while the cutters are operating on the work, in the direction which causes the cutters to recede, a set of chasers movably mounted on the stock in such position that by continuing to turn the stock in the working direction, the chasers will be brought into working engagement with the tapered "work", and an adjuster for simultaneously adjusting said chasers to the diameter of the "work."

3. In a tool for cutting tapered threads, the combination of a tubular work holder adapted to embrace and be fixed to the work to be threaded, a stock which telescopes said work holder and is adapted to be turned and moved longitudinally relative thereto, a set of cutters and a set of chasers both movably mounted on the stock and adapted to successively engage and operate upon the work, two adjusters adapted to severally adjust said cutters and chasers to the diameter of the work, and means, which act while the cutters are turning down the work, to move the adjuster associated with the cutters in the cutter receding direction.

4. In a tool for cutting tapered threads, the combination of a stock adapted to turn and move longitudinally relative to the work, a set of cutters and a set of chasers movably mounted on said stock and adapted to successively engage with and operate upon the work, means for adjusting the chasers, means for holding them immovable while they are operating upon the work, means for adjusting the cutters, and means whereby the cutters are gradually receded while they are operating upon the work.

In testimony whereof, I hereunto affix my signature in the presence of two witnesses.

RUSSELL B. TEWKSBURY.

Witnesses:
H. R. SULLIVAN,
A. J. HUDSON.

---

Copies of this patent may be obtained for five cents each, by addressing the "Commissioner of Patents. Washington, D. C."